(12) United States Patent
Takemura

(10) Patent No.: US 12,189,513 B2
(45) Date of Patent: Jan. 7, 2025

(54) VERIFICATION CONTROL APPARATUS, SYSTEM, METHOD, AND NONTRANSITORY COMPUTER-READABLE MEDIUM

(71) Applicant: NEC Corporation, Tokyo (JP)

(72) Inventor: Yuko Takemura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 65 days.

(21) Appl. No.: 17/800,180

(22) PCT Filed: Feb. 25, 2021

(86) PCT No.: PCT/JP2021/007099
§ 371 (c)(1),
(2) Date: Aug. 16, 2022

(87) PCT Pub. No.: WO2021/172429
PCT Pub. Date: Sep. 2, 2021

(65) Prior Publication Data
US 2023/0054078 A1    Feb. 23, 2023

(30) Foreign Application Priority Data

Feb. 28, 2020 (JP) .................................. 2020-032720

(51) Int. Cl.
G06F 11/36    (2006.01)
G06F 8/65    (2018.01)
G06F 11/34    (2006.01)

(52) U.S. Cl.
CPC ............ *G06F 11/3604* (2013.01); *G06F 8/65* (2013.01); *G06F 11/3461* (2013.01)

(58) Field of Classification Search
None
See application file for complete search history.

(56) References Cited

U.S. PATENT DOCUMENTS 11,226,808 B2 *  1/2022  Okada ................. G06F 9/45558
2016/0299829 A1 * 10/2016  Wei ..................... G06F 11/3692
(Continued)

FOREIGN PATENT DOCUMENTS

| JP | 2002-318607 A | 10/2002 |
| JP | 2017-016392 A | 1/2017 |

(Continued)

OTHER PUBLICATIONS

Jebbar, "Architecture for the Automation of Live Testing of Cloud Systems", 2020, IEEE (Year: 2020).*

(Continued)

*Primary Examiner* — Hossain M Morshed

(57) ABSTRACT

A verification control apparatus (1) includes: a first region (12) that is a virtualization execution region where a first information system including a first file operates; a second region (13) that is a virtualization execution region where a common environment setting with the first region is applied and a second information system in which the first file in the first information system is replaced with a second file operates; an input control unit (11) that transfers a processing request to each of a region where the operation setting is made and a region where the verification setting is made; and an output control unit (15) that transfers an output of a processing result from a region where the operation setting is made to a transmission destination transfer the processing result from a region where the verification setting is made to a transmission destination.

7 Claims, 7 Drawing Sheets

(56) References Cited

U.S. PATENT DOCUMENTS

| | | | | |
|---|---|---|---|---|
| 2017/0034023 | A1* | 2/2017 | Nickolov | H04L 43/0817 |
| 2017/0286259 | A1* | 10/2017 | Watanabe | G06F 11/3612 |
| 2019/0349450 | A1* | 11/2019 | Brandwine | H04L 63/126 |
| 2020/0073783 | A1* | 3/2020 | Hortala | G06F 9/54 |

FOREIGN PATENT DOCUMENTS

| | | |
|---|---|---|
| JP | 2017-187883 A | 10/2017 |
| JP | 2019-057945 A | 4/2019 |

OTHER PUBLICATIONS

International Search Report for PCT Application No. PCT/JP2021/007099, mailed on Apr. 27.2021.

Yamada Akinori, "Docker/Kubernetes: a practical introduction to container development", 1st edition, Gijutsu-Hyohron Co., Ltd., May 11. 2019, pp. 68-69, 143-147, 351.

* cited by examiner

VERIFICATION CONTROL APPARATUS, SYSTEM, METHOD, AND NONTRANSITORY COMPUTER-READABLE MEDIUM

This application is a National Stage Entry of PCT/JP2021/007099 filed on Feb. 25, 2021, which claims priority from Japanese Patent Application 2020-032720 filed on Feb. 28, 2020, the contents of all of which are incorporated herein by reference, in their entirety.

TECHNICAL FIELD

The present disclosure relates to a verification control apparatus, a system, a method, and a program, and particularly, relates to a verification control apparatus, a system, a method, and a program that control verification of an information system.

BACKGROUND ART

In a field of operation of an information system, when system failure occurs, changing or updating the system is performed in order to restore the system to normal operation. In changing or updating a system, in order to prevent a malfunction in a production environment, a verification environment is prepared separately as a pseudo environment, an operation is confirmed in the verification environment, and then the system is applied to the production environment in many cases.

Patent Literature 1 discloses a technique related to a computer system including a virtual machine of an operation version and a virtual machine of a verification version. In addition to a system to be verified, the virtual machine of the verification version includes a verification system including a stub application and a verification function unit.

CITATION LIST

Patent Literature

[Patent Literature 1] Japanese Unexamined Patent Application Publication No. 2017-016392

SUMMARY OF INVENTION

Technical Problem

The technique according to Patent Literature 1 has a problem that, since there is a difference between a production environment and a verification environment, a risk of failure is remained when a target system is released to the production environment after verification in the verification environment. For example, in Patent Literature 1, an effect of the stub application and the verification system included in the virtual machine of the verification version is difficult to ignore.

The present disclosure has been made in order to solve such a problem, and an object of the present disclosure is to provide a verification control apparatus, a system, a method, and a program for reducing a risk of failure in release after verification.

Solution to Problem

A verification control apparatus according to a first aspect of the present disclosure includes:

a first region configured to be a virtualization execution region where a first information system including a first file operates;

a second region configured to be a virtualization execution region where a common environment setting with the first region is applied and a second information system in which the first file in the first information system is replaced with a second file operates;

a storage unit configured to store setting information in which an operation setting is made for one of the first region and the second region, and a verification setting is made for the other;

an input control unit configured to transfer, when a processing request for an information system operating based on the environment setting is accepted from an outside, the processing request to a region according to the setting information; and an output control unit configured to control outputs from the first region and the second region according to the setting information, the input control unit transfers the processing request to each of a region where the operation setting is made and a region where the verification setting is made, and the output control unit transfers, when an output of a processing result for the processing request is detected from a region where the operation setting is made, the processing result to a transmission destination of the processing result, and inhibits, when an output of a processing result for the processing request is detected from a region where the verification setting is made, transfer to a transmission destination of the processing result.

A verification control system according to a second aspect of the present disclosure includes:

a first region configured to be a virtualization execution region where a first information system including a first file operates;

a second region configured to be a virtualization execution region where a common environment setting with the first region is applied and a second information system in which the first file in the first information system is replaced with a second file operates;

a storage unit configured to store setting information in which an operation setting is made for one of the first region and the second region, and a verification setting is made for the other;

a terminal configured to transmit a processing request for an information system operating based on the environment setting;

an input control unit configured to transfer, when the processing request is accepted from the terminal, the processing request to a region according to the setting information; and an output control unit configured to control outputs from the first region and the second region according to the setting information, the input control unit transfers the processing request to each of a region where the operation setting is made and a region where the verification setting is made, and the output control unit transfers, when an output of a processing result for the processing request is detected from a region where the operation setting is made, the processing result to a transmission destination of the processing result, and inhibits, when an output of a processing result for the processing request is detected from a region where the verification setting is made, transfer to a transmission destination of the processing result.

A verification control method according to a third aspect of the present disclosure includes,
by a computer:
storing, in a storage apparatus, setting information in which an operation setting is made for one of a first region, which is a virtualization execution region where a first information system including a first file operates, and a second region, which is a virtualization execution region where a common environment setting with the first region is applied and a second information system in which the first file in the first information system is replaced with a second file operates, and a verification setting is made for the other;
accepting, from an outside, a processing request for an information system operating based on the environment setting;
transferring the processing request to each of a region where the operation setting is made and a region where the verification setting is made;
transferring, when an output of a processing result for the processing request is detected from a region where the operation setting is made, the processing result to a transmission destination of the processing result; and
inhibiting, when an output of a processing result for the processing request is detected from a region where the verification setting is made, transfer to a transmission destination of the processing result.

A verification control program according to a fourth aspect of the present disclosure causes a computer to execute:
processing of storing, in a storage apparatus, setting information in which an operation setting is made for one of a first region, which is a virtualization execution region where a first information system including a first file operates, and a second region, which is a virtualization execution region where a common environment setting with the first region is applied and a second information system in which the first file in the first information system is replaced with a second file operates, and a verification setting is made for the other;
processing of accepting, from an outside, a processing request for an information system operating based on the environment setting;
processing of transferring the processing request to each of a region where the operation setting is made and a region where the verification setting is made;
processing of transferring, when an output of a processing result for the processing request is detected from a region where the operation setting is made, the processing result to a transmission destination of the processing result; and
processing of inhibiting, when an output of a processing result for the processing request is detected from a region where the verification setting is made, transfer to a transmission destination of the processing result.

Advantageous Effects of Invention

According to the present disclosure, a verification control apparatus, a system, a method, and a program for reducing a risk of failure in release after verification can be provided.

EXAMPLE EMBODIMENT

Hereinafter, example embodiments of the present disclosure will be described in detail with reference to the drawings. In each drawing, the same or corresponding elements are denoted by the same reference signs, and duplicate descriptions are omitted as necessary for clarity of description.

First Example Embodiment

Figure 1:
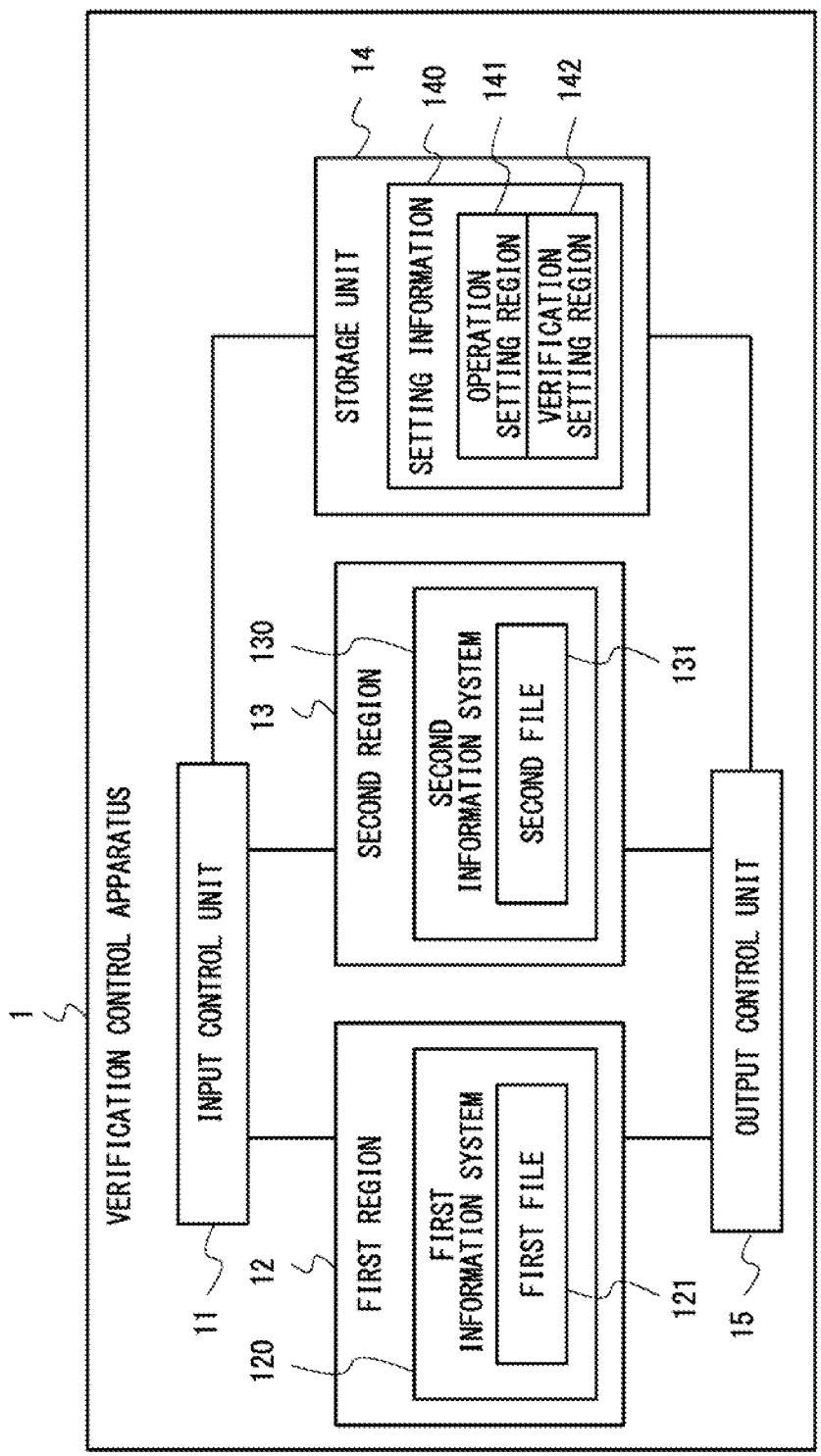
FIG. 1 is a block diagram illustrating a configuration of a verification control apparatus according to a first example embodiment.

FIG. 1 is a block diagram illustrating a configuration of a verification control apparatus 1 according to a first example embodiment. The verification control apparatus 1 is an information processing apparatus or an information processing system capable of achieving both production operation and verification with respect to an information system operating based on a predetermined environment setting. The verification control apparatus 1 includes an input control unit 11, a first region 12, a second region 13, a storage unit 14, and an output control unit 15.

The first region 12 is a virtualization execution region where a first information system 120 including a first file 121 operates. The virtualization execution region is, for example, a virtual machine or a virtual container, is a region where an independent execution environment is virtually achieved, and is a region where a predetermined information system can be independently executed.

The second region 13 is a virtualization execution region where a common environment setting with the first region 12 is applied. Herein, the environment setting refers to a system environment such as a network address. In other words, the first region 12 and the second region 13 are not distinguished from an outside of the verification control apparatus 1 by a network address or the like. In addition, the second region 13 is a virtualization execution region where a second information system 130 operates. Herein, the second information system 130 is a system that the first file 121 in the first information system 120 is replaced with a second file 131.

The first file 121 is a file or a setting file of an application program (processing logic) of the first information system 120, and a part of a scenario or a rule for automation. The second file 131 is at least partially different from the first file 121. The second file 131 is, for example, a file of an updated version of the first file 121, and may be a verification target. Therefore, the first information system 120 and the second information system 130 are mostly common, but the first file 121 and the second file 131 are different from each other.

The storage unit 14 is a storage region for storing a setting information 140 in which an operation setting is made for one of the first region 12 and the second region 13 and a verification setting is made for the other. In other words, the setting information 140 is information defining an operation setting region 141 and a verification setting region 142. Note that, the setting information 140 may be undefined (unset) in either the operation setting region 141 or the verification setting region 142.

When the input control unit 11 accepts, from an outside, a processing request for an information system operating based on the environment setting, the input control unit 11 transfers the processing request to a region according to the setting information 140. Specifically, the input control unit 11 transfers the processing request to each of a region (indicated by the operation setting region 141) where an operation setting is made and a region (indicated by the verification setting region 142) where a verification setting is made. Note that, the "information system operating based on the environment setting" is an information system operating on the environment setting in the verification control apparatus 1. Therefore, both of the first information system 120 and the second information system 130 correspond to the information system. In addition, the input control unit 11 may refer to the setting information 140, and when either the operation setting region 141 or the verification setting region 142 is unset, the processing request may not be transferred to the unset region.

The output control unit 15 controls outputs from the first region 12 and the second region 13 according to the setting information 140. Specifically, when the output control unit 15 detects an output of a processing result for a processing request from a region where the operation setting is made, the output control unit 15 transfers the processing result to a transmission destination of the processing result. In addition, when the output control unit 15 detects an output of a processing result for a processing request from a region where the verification setting is made, the output control unit 15 inhibits transfer of the processing result to the transmission destination.

Figure 2:
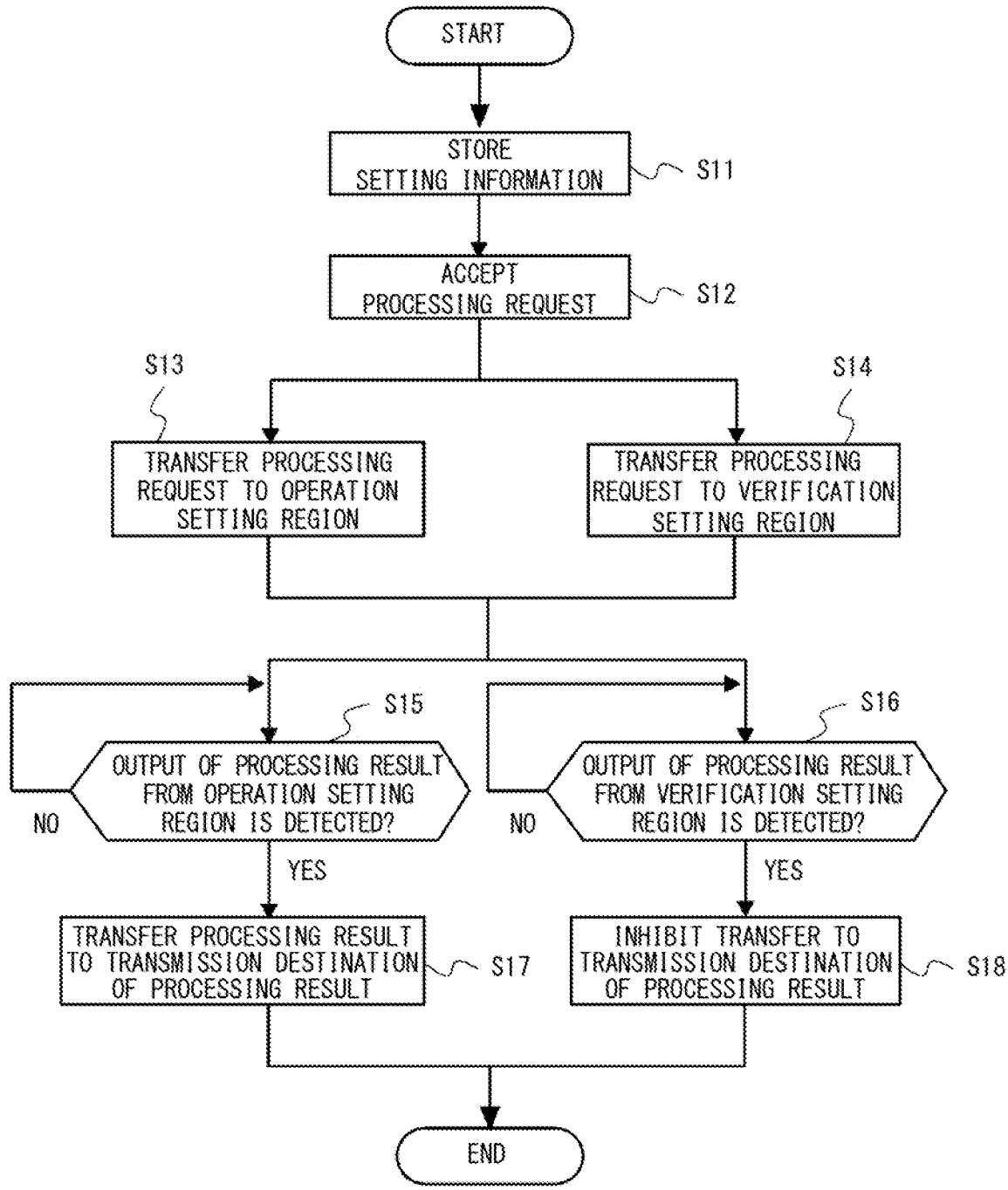
FIG. 2 is a flowchart illustrating a flow of a verification control method according to the first example embodiment.

FIG. 2 is a flowchart illustrating a flow of a verification control method according to the first example embodiment. First, the verification control apparatus 1 stores the setting information 140 in the storage unit 14 (S11). Herein, as described above, the setting information 140 is information in which the operation setting is made for one of the first region 12 and the second region 13, and the verification setting is made for the other.

Next, the input control unit 11 accepts, from an outside of the verification control apparatus 1, a processing request for an information system operating based on the environment setting (S12). Then, the input control unit 11 transfers the processing request to a region (a region indicated by the operation setting region 141) where the operation setting is made (S13). In addition, the input control unit 11 transfers the processing request to a region (a region indicated by the verification setting region 142) where the verification setting is made (S14).

Subsequently, when an output of a processing result for the processing request from the region where the operation setting is made is detected (YES in S15), the output control unit 15 transfers the processing result to a transmission destination of the processing result (S17). Herein, the "transmission destination" may be a request source of the processing request, or may be another system. In addition, when not detecting (NO in S15), the output control unit 15 waits for a while and then determines whether to detect again.

In addition, when an output of a processing result for the processing request from the region where the verification setting is made is detected (YES in S16), the output control unit 15 inhibits transfer to the transmission destination of the processing result (S18). In addition, when not detecting (NO in S16), the output control unit 15 waits for a while and then determines whether to detect again.

As described above, in the present example embodiment, information systems having some files different from each other in the first region 12 and the second region 13 where environment settings are common with each other are operated, and processing requests for each of the information systems are transferred to each of the regions. Then, when an output from each region is detected, transfer of a processing result or inhibition is controlled according to the setting information. For example, in a case of assuming the first region 12 is the operation setting region 141 and the second region 13 is the verification setting region 142, one processing request is executed in parallel in each region. Then, only an output from the first region 12 being the operation setting is transferred to the transmission destination of the processing result, but an output from the second region 13 being the verification setting is not transferred. In other words, an execution result in a verification environment does not affect a production environment. Then, for example, by outputting the output from the second region 13 to a destination other than the transmission destination of the processing result, the processing result in the second region 13 can be confirmed and verified. Then, after the operation setting region 141 is verified as the first region 12 and the verification setting region 142 is verified as the second region 13, the second information system 130 can be released as an operation system by replacing the regions of the operation setting region 141 and the verification setting region 142. Herein, as described above, since the first region 12 and the second region 13 have common environment settings, a difference between the first information system 120 and the second information system 130 can be said to be only the first file 121 and the second file 131. Then, the second information system 130 processes a processing request having the same content as that of the first information system 120, which was the original operation system, and verifies the processing result, instead of the verification using test data. In other words, it is possible to verify presence or absence of a defect due to the second file 131. Therefore, even when the operation setting and the verification setting are replaced after the verification, a risk of failure in release after the verification can be reduced.

Note that, when the operation setting region 141 is turned on and the verification setting region 142 is turned off, normal operation can be achieved. In addition, only the verification may be performed by turning off the operation setting region 141 and turning on the verification setting region 142.

Note that, the verification control apparatus 1 includes a processor, a memory, and a storage apparatus as a configuration not illustrated. In addition, the storage apparatus stores a computer program implementing processing of the verification control method according to the present example embodiment. Then, the processor causes a computer program to be read from the storage apparatus into the memory, and executes the computer program. Thus, the processor achieves a function of the input control unit 11, the first region 12, the second region 13, and the output control unit 15.

In addition, as the processor, a central processing unit (CPU), a graphics processing unit (GPU), a field-programmable gate array (FPGA), or the like can be used.

In addition, when a part or all of each of constituent elements of the verification control apparatus 1 are achieved by a plurality of information processing apparatuses, circuits, and the like, the plurality of information processing apparatuses, circuits, and the like may be centrally arranged, or may be distributed. For example, the information processing apparatus, the circuit, and the like may be achieved as a form, such as a client-server system and a cloud computing system, each of which is connected via a communication network. In addition, the function of the verification control apparatus 1 may be provided in a software as a service (SaaS) form.

Second Example Embodiment

Figure 3:
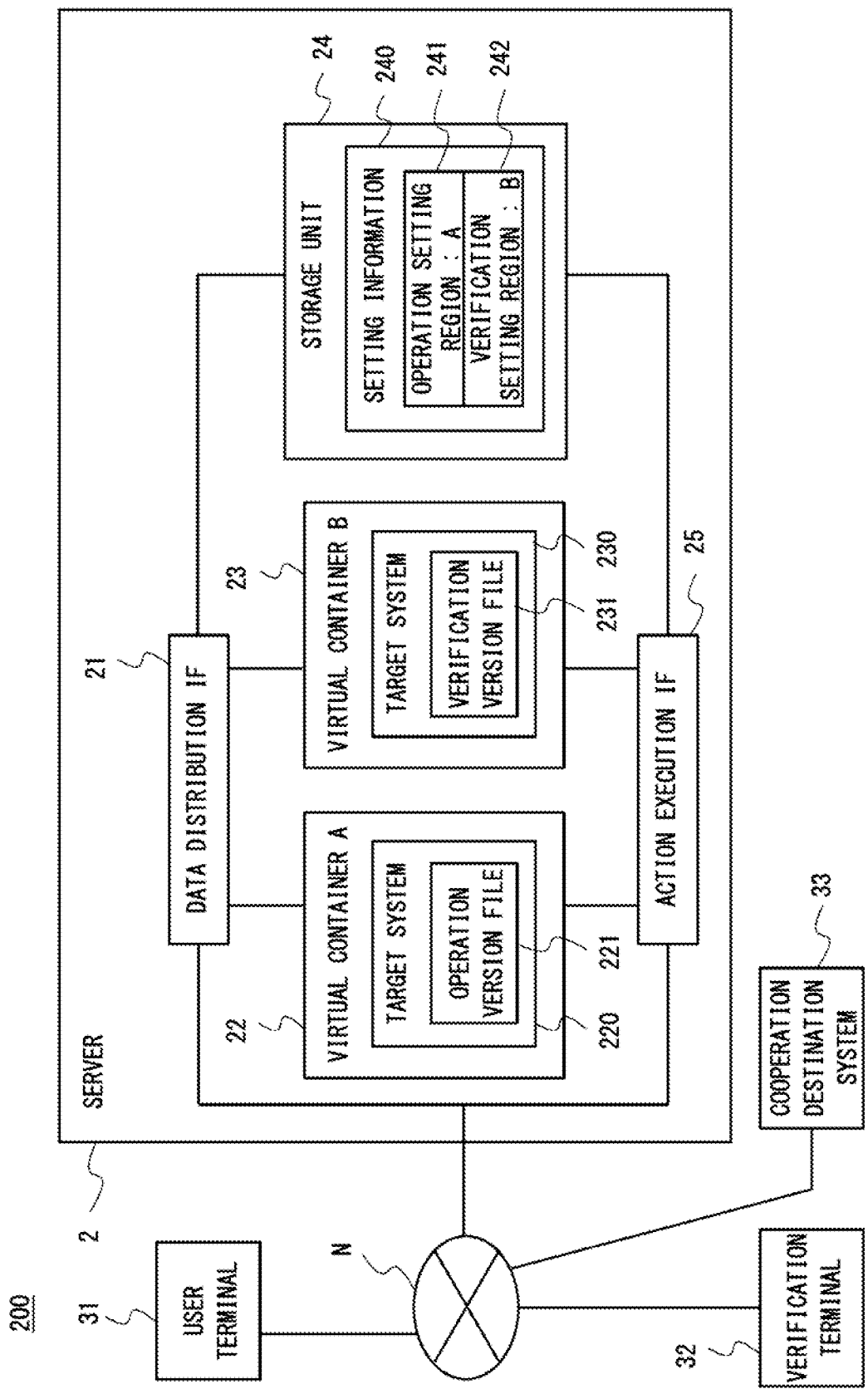
FIG. 3 is a block diagram illustrating an overall configuration of a verification control system according to a second example embodiment.

A second example embodiment is a specific example of the first example embodiment described above. FIG. 3 is a block diagram illustrating an overall configuration of a verification control system 200 according to the second example embodiment. The verification control system 200 includes a user terminal 31, a verification terminal 32, a cooperation destination system 33, and a server 2, which are connected via a network N with one another.

The user terminal 31 is a terminal device operated by a user who uses a service provided by a target system. The user terminal 31 transmits a processing request for a desired service to the server 2 via the network N, and receives a processing result. The user terminal 31 is, for example, a personal computer or other information processing apparatus.

The verification terminal 32 is a terminal device operated by an operator who verifies a target system. The verification terminal 32 transmits a processing request for a service to be verified to the server 2 via the network N, and receives a processing result and verification information. Note that, the verification terminal 32 also receives verification information according to a processing request from the user terminal 31. The verification terminal 32 is an information processing apparatus such as a personal computer or the like.

The cooperation destination system 33 is one example of a third information system, and is an information system of a cooperation destination of a target system. The cooperation destination system 33 may be a transmission destination of a processing result of the target system in a predetermined service. In this case, the cooperation destination system 33 processes the processing result from the target system as a processing request, and replies a processing result to a request source.

The server 2 is a specific example of a verification control apparatus 1, and each function in the server 2 may be achieved by being distributed among a plurality of server apparatuses. The server 2 includes a data distribution interface (IF) 21, a virtual container A 22, a virtual container B 23, a storage unit 24, and an action execution IF 25.

Each of the virtual container A 22 and the virtual container B 23 is a virtualization execution region allocated in the server 2, and is one example of a first region 12 and a second region 13. Therefore, the virtual container A 22 and the virtual container B 23 are applied to a (common) environment setting in the server 2. In the virtual container A 22, a target system 220 is operated, and in the virtual container B 23, a target system 230 is operated. The target system 230 is acquired by replacing an operation version file 221 in the target system 220 with a verification version file 231. The operation version file 221 is a file or a setting file of an application program (processing logic) of the target system 220, and a part of a scenario or a rule (setting content) for automation. The verification version file 231 is a file at least partially updated with respect to the operation version file 221.

The storage unit 24 is one example of the storage unit 14 described above, and stores setting information 240. The setting information 240 is one example of the setting information 140 described above, and it is assumed that the virtual container A 22 is set as an operation setting region 241, and the virtual container B 23 is set as a verification setting region 242. Note that, one of the operation setting region 241 and the verification setting region 242 may be unset. In addition, the verification terminal 32 may change a setting in such a way as to replace virtual containers in the operation setting region 241 and the verification setting region 242 of the setting information 240.

The data distribution IF 21 is one example of the input control unit 11 described above, and when a processing request for a target system is accepted from the user terminal 31 or the like via the network N, the data distribution IF 21 transfers the processing request to a virtual container according to the setting information 240. For example, when the virtual container A 22 is set as an operation setting and the virtual container B 23 is set as a verification setting, the data distribution IF 21 transfers a processing request to the virtual container A 22, reproduces the processing request, and transfers the reproduced processing request to the virtual container B 23. Note that, the data distribution IF 21 refers to the setting information 240, and inhibits transfer for an unset region in the operation setting region 241 and the verification setting region 242.

The action execution IF 25 is one example of the output control unit 15 described above, and controls outputs from the virtual container A 22 and the virtual container B 23 according to the setting information 240. The action execution IF 25 monitors the output from each of the virtual container A 22 and the virtual container B 23. When the action execution IF 25 detects the output, the action execution IF 25 refers to the setting information 240, and determines whether a virtual container being an output source is the operation setting region 241 or the verification setting region 242.

When the virtual container whose output is detected is the operation setting region 241 (e.g., the virtual container A 22), the action execution IF 25 transfers a processing result to a transmission destination of the processing result indicated by the output. Herein, the transmission destination may be the user terminal 31 or the verification terminal 32 being a request source of the processing request, or the cooperation destination system 33 being a cooperation destination system.

When the virtual container whose output is detected is the verification setting region 242 (e.g., virtual container B 23), the action execution IF 25 inhibits transmission of a processing result to a transmission destination of the processing result indicated by the output, and generates verification information of the processing result. Then, the action execution IF 25 outputs the verification information of the processing result to the verification terminal 32. For example, when the request source of the processing request and the transmission destination of the processing result are the user terminal 31, the action execution IF 25 outputs the verification information of the processing result to the verification terminal 32 other than the transmission destination.

Herein, the action execution IF 25 may output, as verification information, a result of communication confirmation with the transmission destination. For example, when the transmission destination is the cooperation destination system 33, the action execution IF 25 transmits a communication command to the cooperation destination system 33, receives the response result, and outputs the response result included in the verification information to the verification terminal 32.

Figure 4:
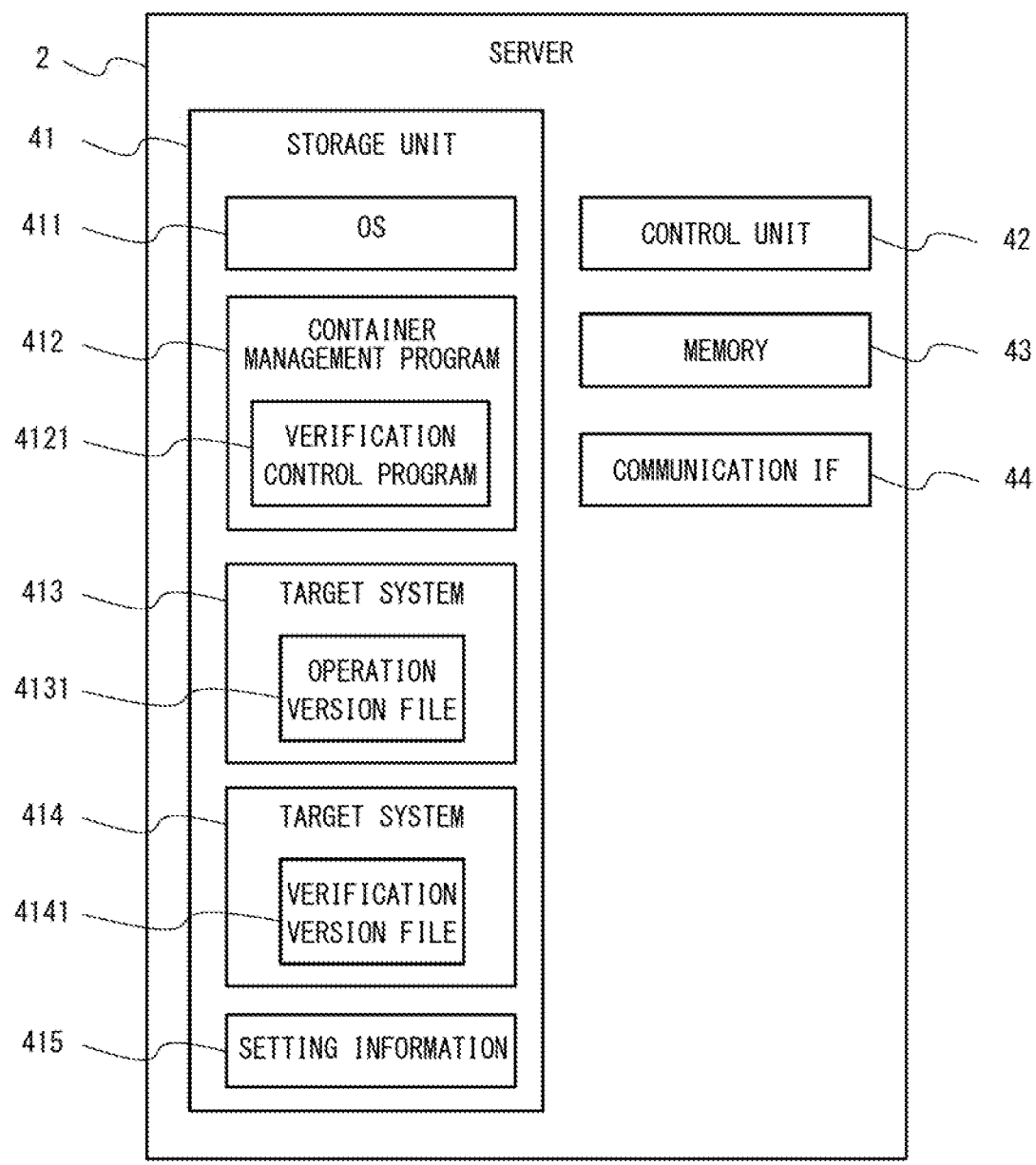
FIG. 4 is a block diagram illustrating a hardware configuration of a server according to the second example embodiment.

FIG. 4 is a block diagram illustrating a hardware configuration of the server 2 according to the second example embodiment. The server 2 is, for example, a computer server, but each function may be distributed among a plurality of servers. FIG. 4 illustrates the server 2 described above in terms of hardware. The server 2 includes a storage unit 41, a control unit 42, a memory 43, and a communication IF 44.

The storage unit 41 is a storage apparatus such as a hard disk, or a flash memory. The storage unit 41 stores an operating system (OS) 411, a container management program 412, a target system 413, a target system 414, and setting information 415. The OS 411 is basic software for operating the server 2, a well-known software can be applied, and therefore description thereof is omitted. The container management program 412 is a computer program for managing and controlling a virtual container. The container management program 412 includes a verification control program 4121 according to the present example embodiment. Note that, the verification control program 4121 may be a program external to the container management program 412. The verification control program 4121 is a computer program and a module in which processing of the data distribution IF 21 and the action execution IF 25 described above are implemented. The target system 413 is a computer program, a setting file, and the like for achieving the virtual container A 22 described above. The target system 413 includes an operation version file 4131 equivalent to the operation version file 221 described above. The target system 414 is a computer program, a setting file, and the like for achieving the virtual container B 23. The target system 414 includes a verification version file 4141 equivalent to the verification version file 231 described above. The setting information 415 is a file equivalent to the setting information 240 described above.

The memory 43 is a volatile storage device such as a random access memory (RAM), and is a storage region for temporarily holding information during an operation of the control unit 42. The communication IF 44 is an interface for inputting and outputting from and to an outside of the server 2. For example, the communication IF 44 accepts a processing request or the like via the network N, and outputs the accepted processing request to the control unit 42. In addition, the communication IF 44 performs output via the network N in response to an instruction from the control unit 42.

The control unit 42 is a processor for controlling each configuration of the server 2, i.e., a control device. The control unit 42 reads the OS 411 and the container management program 412 from the storage unit 41 into the memory 43, and executes the OS 411 and the container management program 412. Thereby, the control unit 42 can operate one or more virtual containers, and achieves the functions of the data distribution IF 21 and the action execution IF 25 described above. Then, the control unit 42 reads the target system 413, the target system 414, and the setting information 415 from the storage unit 41 into the memory 43, and executes the target system 413 and the target system 414.

Thereby, the control unit 42 achieves the functions of the virtual container A 22 and the virtual container B 23 described above.

Figure 5:
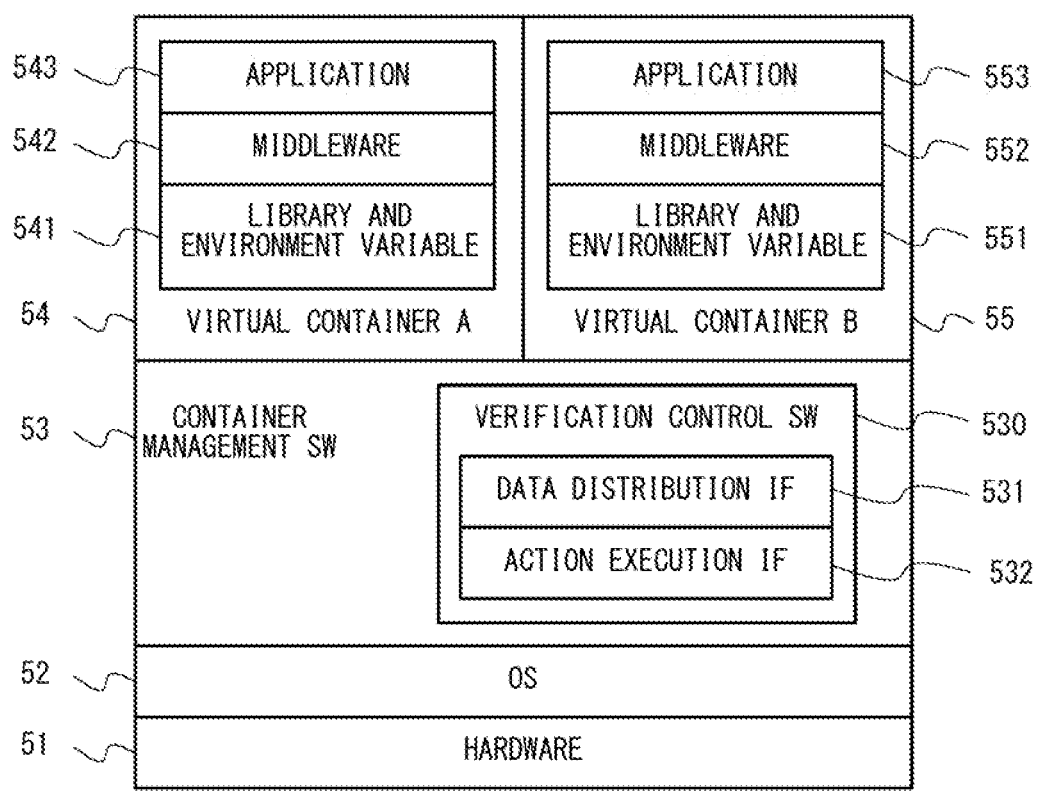
FIG. 5 is a diagram for explaining a concept of virtualization according to the second example embodiment.

FIG. 5 is a diagram for explaining a concept of virtualization according to the second example embodiment. FIG. 5 is a conceptual diagram illustrating the server 2 from a viewpoint of virtualization. First, an OS 52 operates on hardware 51, and a container management software (SW) 53 operates on the OS 52. Herein, the container management SW 53 internally includes a verification control SW 530 (equivalent to the verification control program 4121 described above) according to the present example embodiment. Then, the verification control SW 530 includes a data distribution IF 531 and an action execution IF 532. In addition, a virtual container A 54 and a virtual container B 55 operate on the container management SW 53.

The virtual container A 54 includes a library and environment variable 541, middleware 542, and an application 543 equivalent to the target system 220. For example, the middleware 542 is executed with reference to the library and environment variable 541, and the application 543 is executed on the middleware 542 with reference to the library and environment variable 541. Herein, the operation version file 221 is all or a part of the library and environment variable 541, the middleware 542, and the application 543.

Similarly, the virtual container B 55 includes a library and environment variable 551, middleware 552, and an application 553 equivalent to the target system 230. For example, the middleware 552 is executed with reference to the library and environment variable 551, and the application 553 is executed on the middleware 552 with reference to the library and environment variable 551. Herein, the verification version file 231 is all or a part of the library and environment variable 551, the middleware 552, and the application 553.

Figure 6:
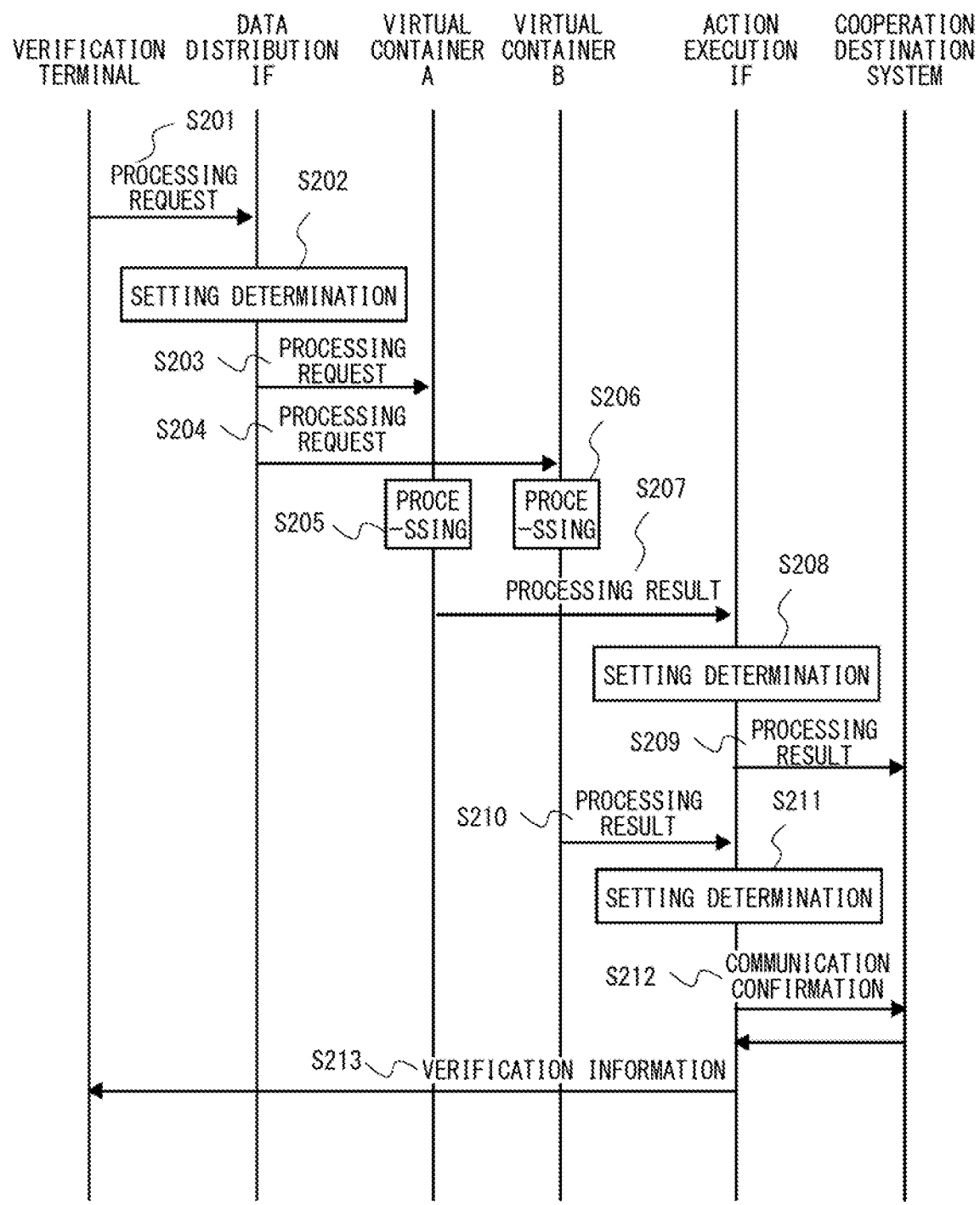
FIG. 6 is a sequence diagram illustrating a flow of a verification control method according to the second example embodiment.

FIG. 6 is a sequence diagram illustrating a flow of a verification control method according to the second example embodiment. First, the verification terminal 32 transmits a processing request for a service to be verified in a target system to the server 2 via the network N (S201). In response to this, the data distribution IF 21 of the server 2 receives the processing request.

Next, the data distribution IF 21 refers to the setting information 240 in the storage unit 24, and determines how the operation setting region 241 and the verification setting region 242 are set (S202). Herein, it is assumed that the virtual container A 22 is set in the operation setting region 241, and the virtual container B 23 is set in the verification setting region 242. Therefore, the data distribution IF 21 transfers the received processing request to the virtual container A 22 for which the operation setting is made (S203), reproduces the processing request, and transfers the reproduced processing request to the virtual container B 23 for which the verification setting is made (S204).

Next, the target system 220 of the virtual container A 22 performs processing for the transferred processing request (S205). In other words, the target system 220 performs processing in production operation using the operation version file 221.

In addition, the target system 230 of the virtual container B 23 performs processing for the transferred processing request (S206). In other words, the target system 230 performs processing of a verification target using the verification version file 231.

After step S205, the target system 220 outputs a processing result for the processing request (S207). Herein, it is assumed that a transmission destination of the processing result is the cooperation destination system 33. Therefore, the target system 220 outputs the processing result to the cooperation destination system 33 as a destination.

At this time, the action execution IF 25 detects an output from the virtual container A 22. Then, the action execution IF 25 refers to the setting information 240 of the storage unit 24, and determines whether a setting of the virtual container A 22 being an output source is the operation setting region 241 or the verification setting region 242 (S208). Herein, since the virtual container A 22 is set in the operation setting region 241, the action execution IF 25 transfers the detected processing result to the cooperation destination system 33 being a destination (transmission destination) of the processing result (S209). Thus, the cooperation destination system 33 can receive the processing result as output from the virtual container A 22, and can continue subsequent processing. For example, the cooperation destination system 33 may reply a processing result as the subsequent processing to the verification terminal 32.

In addition, after step S206, the target system 230 outputs a processing result for the processing request (S210). Similarly described above, the target system 230 outputs the processing result to the cooperation destination system 33 as a destination.

At this time, the action execution IF 25 detects an output from the virtual container B 23. Then, the action execution IF 25 refers to the setting information 240 of the storage unit 24, and determines whether a setting of the virtual container B 23 being an output source is the operation setting region 241 or the verification setting region 242 (S211). Herein, since the virtual container B 23 is set in the verification setting region 242, the action execution IF 25 inhibits transfer of the detected processing result to the cooperation destination system 33 being a destination (transmission destination) of the processing result. Instead, the action execution IF 25 performs communication confirmation on the cooperation destination system 33 (S212). For example, the action execution IF 25 issues a communication command to the cooperation destination system 33 via the network N, and receives a response result.

Then, the action execution IF 25 generates verification information including the received response result, and transmits the generated verification information to the verification terminal 32 via the network N (S213). Note that, the verification terminal 32 may include the processing result itself in step S210 in the verification information. The verification terminal 32 displays the received verification information on a screen. Thus, an operator can confirm whether the displayed verification information is appropriate, and perform verification.

In addition, the user terminal 31 can also perform step S201 in FIG. 6. Then, even in this case, it is assumed that the transmission destination in step S213 is set in advance in such a way as to be the verification terminal 32. In addition, when the destination (transmission destination) of the processing result is the user terminal 31, the processing result in step S209 and the communication confirmation in step S212 are transmitted to the user terminal 31, but the verification information in step S213 is transmitted to the verification terminal 32. Further, when the request source in step S201 and the destination (transmission destination) of the processing result is the verification terminal 32, the verification terminal 32 receives the processing result in step S209, (the communication confirmation in step S212) and the verification information in step S213. Therefore, it is possible to confirm the processing result and the verification information in the verification terminal 32 and perform the verification more easily.

Therefore, in the present example embodiment, regardless of whether the request source in step S201 is the user terminal 31 or the verification terminal 32, the processing result in the operation setting region 241 is transmitted to the original transmission destination, and the verification information is transmitted to the verification terminal 32. Therefore, verification of the verification version file 231 can be performed by actual service data (data used in the production operation) without affecting the production operation. In other words, even at a time of verification, it is not necessary to correct the destination or parameter of the processing request for verification, and the verification can be performed using the same input data (destination or parameter) as in the production operation.

Then, the target systems 220 and 230 operate in a common environment setting. Therefore, the verification of the verification version file 231 is possible depending on whether there is a difference between the processing results in steps S207 and S210. For example, in a case where it is verified that degradation does not occur due to update of a system, it is only necessary to confirm that there is no difference between the processing results in steps S207 and S210. Note that, "degradation" refers to a case where, when a system is updated (upgraded), a function indicating a normal processing result before the update indicates an inaccurate processing result due to a bug of software or the like after the update. In addition, when the processing result is changed by changing a system, it is only necessary to confirm that the difference between the processing results in steps S207 and S210 is as assumed.

Then, when there is no problem in the verification, system change can be released by replacing the operation version file 221 in the target system 220 with the verification version file 231 at any timing. At this time, a difference between a system of an operation version and a verification version is the operation version file 221 and the verification version file 231, and since it can be confirmed that there is no problem in the verification version file 231, a risk of failure in the release after the verification can be reduced. Note that, after the release, by turning off the verification setting region 242 or stopping operation of the target system 230 in the virtual container B 23, only the target system 220 can be operated.

Alternatively, when there is no problem in the verification, the system change may be released by replacing the virtual containers in the operation setting region 241 and the verification setting region 242. Even in this case, since the target system 230 of the virtual container B 23 has already been verified by the common environment setting with the target system 220, a risk of failure in the release after the verification can be reduced.

Third Example Embodiment

A third example embodiment is an improved example of the second example embodiment described above. In other words, the processing result includes a processing request to a third information system being the transmission destination, and the output control unit outputs detailed information of the processing request to the third information system as the verification information. Note that, since other configurations are similar to those of the second example embodiment, an illustration and detailed description of a common portion are omitted.

Figure 7:
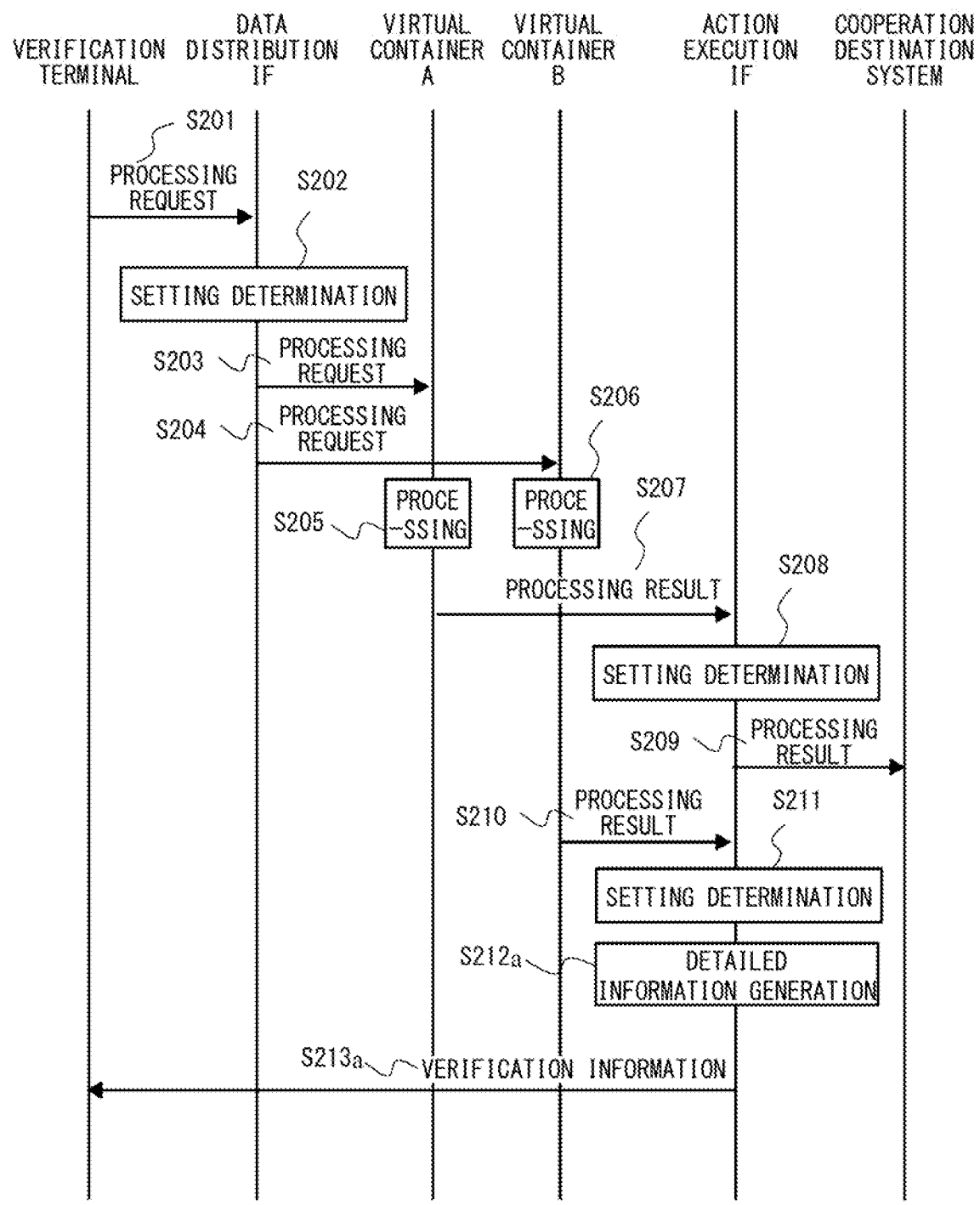
FIG. 7 is a sequence diagram illustrating a flow of a verification control method according to a third example embodiment.

FIG. 7 is a sequence diagram illustrating a flow of a verification control method according to the third example embodiment. FIG. 7 is the same as FIG. 6 in steps S201 to S211. An action execution IF 25 according to the present example embodiment determines that a virtual container B 23 being an output source of a processing result detected in step S211 is set in a verification setting region 242. Therefore, the action execution IF 25 inhibits transfer of the detected processing result to a cooperation destination system 33 being a destination (transmission destination) of the processing result. In addition, the processing result includes a processing request to the cooperation destination system 33 being a cooperation destination. Therefore, the action execution IF 25 generates detailed information of the processing request (S212a). Herein, the detailed information is information of a parameter related to an execution command in the cooperation destination system 33 when the processing request is the execution command. For example, the detailed information may be a list of parameters in the processing request. Then, the action execution IF 25 transmits the detailed information included in verification information to a verification terminal 32 via a network N.

As described above, according to the third example embodiment, in addition to similar effects to those of the second example embodiment, verification in the verification terminal 32 can be performed in more detail.

Other Example Embodiment

Note that, in the example embodiments described above, description is made as a hardware configuration, but the present disclosure is not limited thereto. The present disclosure can also achieve any piece of processing by causing a CPU to execute a computer program.

In the examples described above, a program may be stored using various types of non-transitory computer readable media, and supplied to a computer. A non-transitory computer readable medium includes various types of tangible storage media. Examples of non-transitory computer readable media include a magnetic recording medium (e.g., a flexible disk, a magnetic tape, a hard disk drive), a magneto-optical recording medium (e.g., a magneto-optical disk), a CD-read only memory (CD-ROM), a CD-R, a CD-R/W, a digital versatile disc (DVD), and a semiconductor memory (e.g., a mask ROM, a programmable ROM (PROM), an erasable PROM (EPROM), a flash ROM, a random access memory (RAM)). In addition, a program may also be supplied to a computer by various types of transitory computer readable media. Examples of transitory computer readable media include an electric signal, an optical signal, and an electromagnetic wave. The transitory computer readable medium may supply a program to a computer via a wired communication path such as an electric wire and an optical fiber, or a wireless communication path.

Note that, the present disclosure is not limited to the above-mentioned example embodiments, and can be appropriately changed within a range not deviating from the gist. The present disclosure may be achieved by appropriately combining the respective example embodiments.

Some or all of the above example embodiments may also be described as the following supplementary notes, but are not limited to the following.

(Supplementary Note A1)

A verification control apparatus comprising:
a first region configured to be a virtualization execution region where a first information system including a first file operates;
a second region configured to be a virtualization execution region where a common environment setting with the first region is applied and a second information system in which the first file in the first information system is replaced with a second file operates;
storage means for storing setting information in which an operation setting is made for one of the first region and the second region, and a verification setting is made for another;
input control means for transferring, when a processing request for an information system operating based on the environment setting is accepted from an outside, the processing request to a region according to the setting information; and
output control means for controlling outputs from the first region and the second region according to the setting information, wherein
the input control means transfers the processing request to each of a region where the operation setting is made and a region where the verification setting is made, and
the output control means
transfers, when an output of a processing result for the processing request is detected from a region where the operation setting is made, the processing result to a transmission destination of the processing result, and
inhibits, when an output of a processing result for the processing request is detected from a region where the verification setting is made, transfer to a transmission destination of the processing result.

(Supplementary Note A2)

The verification control apparatus according to Supplementary note A1,
wherein, when the operation setting is set in the first region and the verification setting is set in the second region, the input control means transfers the processing request to the first region, and reproduces the processing request and transfers the reproduced processing request to the second region.

(Supplementary Note A3)

The verification control apparatus according to Supplementary note A1 or A2,
wherein, when an output of a processing result for the processing request is detected from a region where the verification setting is made, the output control means outputs verification information of the processing result to a predetermined verification terminal.

(Supplementary Note A4)

The verification control apparatus according to Supplementary note A3,
wherein the output control means outputs a result of communication confirmation with the transmission destination as the verification information.

(Supplementary Note A5)

The verification control apparatus according to Supplementary note A3 or A4, wherein
the processing result includes a processing request to a third information system being the transmission destination, and
the output control means outputs detailed information of a processing request to the third information system as the verification information.

(Supplementary Note A6)

The verification control apparatus according to any one of Supplementary notes A1 to A5, wherein
the first file is processing logic or a setting content relating to the first information system, and
the second file is a file after update of the first file.

(Supplementary Note A7)

The verification control apparatus according to any one of Supplementary notes A1 to A6, wherein each of the first and second regions is a virtual container.

(Supplementary Note B1)

A verification control system comprising:
a first region configured to be a virtualization execution region where a first information system including a first file operates;
a second region configured to be a virtualization execution region where a common environment setting with the first region is applied and a second information system in which the first file in the first information system is replaced with a second file operates;
storage means for storing setting information in which an operation setting is made for one of the first region and the second region, and a verification setting is made for another;
a terminal configured to transmit a processing request for an information system operating based on the environment setting;
input control means for transferring, when the processing request is accepted from the terminal, the processing request to a region according to the setting information; and
output control means for controlling outputs from the first region and the second region according to the setting information, wherein
the input control means transfers the processing request to each of a region where the operation setting is made and a region where the verification setting is made, and
the output control means
transfers, when an output of a processing result for the processing request is detected from a region where the operation setting is made, the processing result to a transmission destination of the processing result, and
inhibits, when an output of a processing result for the processing request is detected from a region where the verification setting is made, transfer to a transmission destination of the processing result.

(Supplementary Note B2)

The verification control system according to Supplementary note B1, wherein,
when the operation setting is set in the first region and the verification setting is set in the second region, the input control means transfers the processing request to the first region, and reproduces the processing request and transfers the reproduced processing request to the second region.

(Supplementary Note C1)

A verification control method comprising,
by a computer:
storing, in a storage apparatus, setting information in which an operation setting is made for one of a first region, which is a virtualization execution region where a first information system including a first file operates, and a second region, which is a virtualization execution region where a common environment setting with the first region is applied and a second information system in which the first file in the first information system is replaced with a second file operates, and a verification setting is made for another;
accepting, from an outside, a processing request for an information system operating based on the environment setting;
transferring the processing request to each of a region where the operation setting is made and a region where the verification setting is made;
transferring, when an output of a processing result for the processing request is detected from a region where the operation setting is made, the processing result to a transmission destination of the processing result; and
inhibiting, when an output of a processing result for the processing request is detected from a region where the verification setting is made, transfer to a transmission destination of the processing result.

(Supplementary Note D1)

A non-transitory computer-readable medium storing a verification control program causing a computer to execute:
processing of storing, in a storage apparatus, setting information in which an operation setting is made for one of a first region, which is a virtualization execution region where a first information system including a first file operates, and a second region, which is a virtualization execution region where a common environment setting with the first region is applied and a second information system in which the first file in the first information system is replaced with a second file operates, and a verification setting is made for another;
processing of accepting, from an outside, a processing request for an information system operating based on the environment setting;
processing of transferring the processing request to each of a region where the operation setting is made and a region where the verification setting is made;
processing of transferring, when an output of a processing result for the processing request is detected from a region where the operation setting is made, the processing result to a transmission destination of the processing result; and
processing of inhibiting, when an output of a processing result for the processing request is detected from a region where the verification setting is made, transfer to a transmission destination of the processing result.

Although the present invention has been described above with reference to the example embodiments (and examples), the present invention is not limited to the above example embodiments (and examples). Various changes that can be understood by those skilled in the art can be made to the configurations and details of the present invention within the scope of the present invention.

This application is based upon and claims the benefit of Japanese patent application No. 2020-032720, filed on Feb. 28, 2020, the disclosure of which is incorporated herein in its entirety by reference.

REFERENCE SIGNS LIST

1 VERIFICATION CONTROL APPARATUS
11 INPUT CONTROL UNIT
12 FIRST REGION
120 FIRST INFORMATION SYSTEM
121 FIRST FILE
13 SECOND REGION
130 SECOND INFORMATION SYSTEM
131 SECOND FILE
14 STORAGE UNIT
140 SETTING INFORMATION
141 OPERATION SETTING REGION
142 VERIFICATION SETTING REGION
15 OUTPUT CONTROL UNIT
200 VERIFICATION CONTROL SYSTEM
2 SERVER
21 DATA DISTRIBUTION IF
22 VIRTUAL CONTAINER A

220 TARGET SYSTEM
221 OPERATION VERSION FILE
23 VIRTUAL CONTAINER B
230 TARGET SYSTEM
231 VERIFICATION VERSION FILE
24 STORAGE UNIT
240 SETTING INFORMATION
241 OPERATION SETTING REGION
242 VERIFICATION SETTING REGION
25 ACTION EXECUTION IF
31 USER TERMINAL
32 VERIFICATION TERMINAL
33 COOPERATION DESTINATION SYSTEM
N NETWORK
41 STORAGE UNIT
411 OS
412 CONTAINER MANAGEMENT PROGRAM
4121 VERIFICATION CONTROL PROGRAM
413 TARGET SYSTEM
4131 OPERATION VERSION FILE
414 TARGET SYSTEM
4141 VERIFICATION VERSION FILE
415 SETTING INFORMATION
42 CONTROL UNIT
43 MEMORY
44 COMMUNICATION IF
51 HARDWARE
52 OS
53 CONTAINER MANAGEMENT SW
530 VERIFICATION CONTROL SW
531 DATA DISTRIBUTION IF
532 ACTION EXECUTION IF
54 VIRTUAL CONTAINER A
541 LIBRARY AND ENVIRONMENT VARIABLE
542 MIDDLEWARE
543 APPLICATION
55 VIRTUAL CONTAINER B
551 LIBRARY AND ENVIRONMENT VARIABLE
552 MIDDLEWARE
553 APPLICATION

The invention claimed is:

1. A verification control apparatus comprising:
a first region configured to be a virtualization execution region in which a first information system operates, the first information system including a first file;
a second region configured to be a virtualization execution region in which a second information system operates, the second information system including a second file,
wherein the first region and the second region share a common environment setting except that in the second information system the first file of the first information system is replaced by the second file;
at least one memory configured to store instructions, and setting information, the setting information including an operation setting and a verification setting,
wherein the operation setting specifies one of the first region and the second region as an operation region,
wherein the verification setting specifies the second region as a verification region when the first region is specified as the operation region, and
wherein the verification setting specifies the first region as the verification region when the second region is specified as the operation region; and
at least one processor configured to execute the instructions to:
accept, from an external information processing apparatus, a processing request for an information system operating based on the environment setting;
transfer the processing request to each of the operation region and the verification region;
when the operation region outputs a processing result for the processing request, transfer the processing result to a transmission destination of the processing result; and
when the verification region outputs the processing result for the processing request:
do not transfer the processing result to the transmission destination;
issue a communication command to the transmission destination and receive a response result of the communication command from the transmission destination; and
output verification information of the processing result to a predetermined verification terminal, the verification information including the response result of the communication command,
and wherein upon successful verification of the processing result:
when the operation setting specifies the first region and the verification setting specifies the second region:
the operation setting is changed to specify the second region instead of the first region, and
any subsequent defect is attributable to the second file because the first region and the second region share the common environment except that that the first file is replaced by the second file; and
when the operation setting specifies the second region and the verification setting specifies the first region:
the operation setting is changed to specify the first region instead of the second region, and
any subsequent defect is attributable to the first file because the first region and the second region share the common environment except that that the first file is replaced by the second file.

2. The verification control apparatus according to claim 1, wherein the at least one processor is further configured to execute the instructions to:
when the operation setting specifies the first region and the verification setting specifies the second region, transfer the processing request to the first region, and reproduce the processing request and transfer the reproduced processing request to the second region.

3. The verification control apparatus according to claim 1, wherein
the verification information includes detailed information of the processing request regarding a third information system that is the transmission destination.

4. The verification control apparatus according to claim 1, wherein
the first file relates to the first information system, and
the second file is the first file after the first file has been updated.

5. The verification control apparatus according to claim 1, wherein each of the first and second regions is a virtual container.

6. A verification control method performed by a computer and comprising:
storing setting information including an operation setting and a verification setting,
wherein the operation setting specifies one of a first region and a second region as an operation region, wherein the verification setting specifies the second
region as a verification region when the first region
is specified as the operation region,
wherein the verification setting specifies the first region
as the verification region when the second region is
specified as the operation region,
wherein the first region is configured to be a virtualization execution region in which a first information
system operates, the first information system including a first file,
wherein the second region is configured to be a virtualization execution region in which a second information system operates, the second information system including a second file, and
wherein the first region and the second region share a common environment setting except that in the second information system the first file of the first information system is replaced by the second file;
accepting, from an external information processing apparatus, a processing request for an information system operating based on the environment setting;
transferring the processing request to each of the operation region and the verification region; when the operation region outputs a processing result for the processing request, transfer the processing result to a transmission destination of the processing result; and
when the verification region outputs the processing result for the processing request:
not transferring the processing result to the transmission destination;
issuing a communication command to the transmission destination and receive a response result of the communication command from the transmission destination; and
outputting verification information of the processing result to a predetermined verification terminal, the verification information including the response result of the communication command,
wherein upon successful verification of the processing result:
when the operation setting specifies the first region and the verification setting specifies the second region:
the operation setting is changed to specify the second region instead of the first region, and
any subsequent defect is attributable to the second file because the first region and the second region share the common environment except that that the first file is replaced by the second file; and
when the operation setting specifies the second region and the verification setting specifies the first region:
the operation setting is changed to specify the first region instead of the second region, and
any subsequent defect is attributable to the first file because the first region and the second region share the common environment except that that the first file is replaced by the second file.

7. A non-transitory computer-readable medium storing a verification control program causing a computer to execute processing comprising:
storing setting information including an operation setting and a verification setting,
wherein the operation setting specifies one of a first region and a second region as an operation region,
wherein the verification setting specifies the first region as the verification region when the second region is specified as the operation region,
wherein the verification setting specifies the second region as the verification region when the first region is specified as the operation region,
wherein the first region is configured to be a virtualization execution region in which a first information system operates, the first information system including a first file,
wherein the second region is configured to be a virtualization execution region in which a second information system operates, the second information system including a second file, and
wherein the first region and the second region share a common environment setting except that in the second information system the first file of the first information system is replaced by the second file;
accepting, from an external information processing apparatus, a processing request for an information system operating based on the environment setting;
transferring the processing request to each of the operation region and the verification region; when the operation region outputs a processing result for the processing request, transfer the processing result to a transmission destination of the processing result; and
when the verification region outputs the processing result for the processing request:
not transferring the processing result to the transmission destination;
issuing a communication command to the transmission destination and receive a response result of the communication command from the transmission destination; and
outputting verification information of the processing result to a predetermined verification terminal, the verification information including the response result of the communication command,
wherein upon successful verification of the processing result:
when the operation setting specifies the first region and the verification setting specifies the second region:
the operation setting is changed to specify the second region instead of the first region, and
any subsequent defect is attributable to the second file because the first region and the second region share the common environment except that that the first file is replaced by the second file; and
when the operation setting specifies the second region and the verification setting specifies the first region:
the operation setting is changed to specify the first region instead of the second region, and
any subsequent defect is attributable to the first file because the first region and the second region share the common environment except that that the first file is replaced by the second file.

* * * * *